(12) United States Patent
Feng et al.

(10) Patent No.: US 8,486,223 B2
(45) Date of Patent: Jul. 16, 2013

(54) FALLING FILM EVAPORATOR

(75) Inventors: Xiaogen Feng, Hangzhou (CN);
Nongyue Wang, Hangzhou (CN);
Xiaohui Mao, Lanxi (CN); Ruibiao Yu,
Hangzhou (CN); Qianwen Cheng,
Shanghai (CN)

(73) Assignee: Jiangsu Sinorgchem Technology Co., Ltd., Taizhou, Jiangsu Province (CN)

(*) Notice: Subject to any disclaimer, the term of this patent is extended or adjusted under 35 U.S.C. 154(b) by 96 days.

(21) Appl. No.: 12/900,459

(22) Filed: Oct. 7, 2010

(65) Prior Publication Data

US 2011/0226606 A1    Sep. 22, 2011

Related U.S. Application Data

(60) Continuation-in-part of application No. 11/759,901, filed on Jun. 7, 2007, now abandoned, which is a division of application No. 11/477,954, filed on Jun. 30, 2006, now Pat. No. 7,235,694, which is a continuation of application No. 10/883,042, filed on Jul. 2, 2004, now Pat. No. 7,084,302.

(30) Foreign Application Priority Data

| | | | |
|---|---|---|---|
| Jul. 4, 2003 | (CN) | ................... | 03 1 48194 |
| Jul. 4, 2003 | (CN) | ................... | 03 1 48195 |
| Jul. 4, 2003 | (CN) | ................... | 03 1 48196 |
| Jul. 4, 2003 | (CN) | ................... | 03 1 48198 |
| Jul. 4, 2003 | (CN) | ................... | 03 1 48199 |
| Jul. 4, 2003 | (CN) | ................... | 03 1 48200 |
| Jul. 4, 2003 | (CN) | ................... | 03 1 48565 |
| Jul. 4, 2003 | (CN) | ................... | 03 1 48566 |

(51) Int. Cl.
*B01D 1/06* (2006.01)
*B01D 1/22* (2006.01)
*B01D 3/02* (2006.01)
*B01D 3/28* (2006.01)
*B01D 3/42* (2006.01)
*C07C 209/86* (2006.01)

(52) U.S. Cl.
USPC ............. 159/49; 159/13.2; 159/43.1; 159/44; 159/DIG. 8; 159/DIG. 10; 202/160; 202/173; 202/236; 202/237; 203/1; 203/2; 203/72; 203/89

(58) Field of Classification Search
USPC ................... 159/11.3, 13.2, 16.3, 27.2, 43.1, 159/44, 49, DIG. 8, DIG. 10; 202/160, 173, 202/236, 237; 203/1, 2, 72, 89, 100; 564/478
See application file for complete search history.

(56) References Cited

U.S. PATENT DOCUMENTS

| | | | |
|---|---|---|---|
| 2,635,100 A | 4/1953 | Werntz | |
| 3,768,539 A | 10/1973 | Chamberlin et al. | |

(Continued)

FOREIGN PATENT DOCUMENTS

| | | |
|---|---|---|
| CN | 1142985 A | 2/1997 |
| CN | 2294446 Y | 10/1998 |

(Continued)

OTHER PUBLICATIONS

Wohl, A., Chemische Berichte 34:2442-2450 (1901).

(Continued)

*Primary Examiner* — Virginia Manoharan
(74) *Attorney, Agent, or Firm* — Manni Li; Mei & Mark LLP

(57) ABSTRACT

A falling film evaporator having a shell pass, multiple tubes parallel to each other, a condensed steam outlet, an inlet for an aqueous solution on the top of the tube pass, an outlet for the aqueous solution at the bottom of the tube pass, a distributing assembly having a plurality of distributing trays arranged vertically from top to bottom in incremental diameters and each having multiple holes, and a plate for collecting the aqueous solution below the distributing assembly. The tubes are straight and installed vertically in the evaporator; inner wall of the tubes is smooth, and the top portion of the tubes is protruded above a horizontal plane of the plate. The evaporator is particularly useful for concentrating an aqueous solution containing thermosensitive materials.

22 Claims, 3 Drawing Sheets

U.S. PATENT DOCUMENTS

| | | | | |
|---|---|---|---|---|
| 3,797,552 | A | 3/1974 | Frank et al. | |
| 3,875,988 | A | 4/1975 | Machida et al. | |
| 4,072,713 | A | 2/1978 | Bjornson | |
| 4,094,734 | A | 6/1978 | Henderson | |
| 4,102,926 | A | 7/1978 | Usvyatsov et al. | |
| 4,135,567 | A | 1/1979 | Mattern | |
| 4,187,248 | A | 2/1980 | Merten et al. | |
| 4,287,365 | A | 9/1981 | Becker et al. | |
| 4,313,002 | A | 1/1982 | Symon et al. | |
| 4,714,530 | A | 12/1987 | Hale et al. | |
| 4,760,186 | A | 7/1988 | Solodar | |
| 4,764,254 | A * | 8/1988 | Rosenblad | 162/249 |
| 4,776,929 | A | 10/1988 | Aoyama et al. | |
| 4,792,626 | A | 12/1988 | Becher et al. | |
| 5,117,063 | A | 5/1992 | Stern et al. | |
| 5,118,388 | A * | 6/1992 | Aboul-Nasr | 159/2.1 |
| 5,253,737 | A | 10/1993 | Klaue | |
| 5,331,099 | A | 7/1994 | Stern et al. | |
| 5,420,354 | A | 5/1995 | Malz et al. | |
| 5,453,541 | A | 9/1995 | Stern et al. | |
| 5,552,531 | A | 9/1996 | Stern et al. | |
| 5,608,111 | A | 3/1997 | Stern et al. | |
| 5,633,407 | A | 5/1997 | Stern et al. | |
| 5,739,403 | A | 4/1998 | Reinartz et al. | |
| 5,840,982 | A | 11/1998 | Reynolds et al. | |
| 5,925,791 | A | 7/1999 | Buysch et al. | |
| 5,932,768 | A | 8/1999 | Ooms et al. | |
| 5,973,206 | A | 10/1999 | Laitinen | |
| 5,977,411 | A | 11/1999 | DeVera | |
| 5,985,231 | A | 11/1999 | Filippi et al. | |
| 5,994,584 | A | 11/1999 | Ooms et al. | |
| 6,043,394 | A | 3/2000 | Langer et al. | |
| 6,137,010 | A | 10/2000 | Joo et al. | |
| 6,140,538 | A | 10/2000 | Rains et al. | |
| 6,316,673 | B2 | 11/2001 | Giera et al. | |
| 6,368,996 | B1 | 4/2002 | Mu et al. | |
| 6,388,136 | B1 | 5/2002 | Beska et al. | |
| 6,395,933 | B1 | 5/2002 | Triplett, II et al. | |
| 6,395,934 | B1 | 5/2002 | Wegener et al. | |
| 6,414,192 | B1 | 7/2002 | Schelhaas et al. | |
| 6,423,872 | B2 | 7/2002 | Marion | |
| 6,495,723 | B1 | 12/2002 | DeVera et al. | |
| 6,583,320 | B2 | 6/2003 | Triplett, II et al. | |
| 6,656,327 | B2 | 12/2003 | Salmisuo | |
| 6,680,280 | B1 | 1/2004 | Birke et al. | |
| 7,112,262 | B2 * | 9/2006 | Bethge | 202/172 |
| 7,176,333 | B2 | 2/2007 | Wang et al. | |
| 2002/0055652 | A1 | 5/2002 | Schelhaas et al. | |
| 2003/0088127 | A1 | 5/2003 | Triplett et al. | |
| 2005/0006219 | A1 * | 1/2005 | Eck et al. | 203/1 |

FOREIGN PATENT DOCUMENTS

| | | |
|---|---|---|
| CN | 1312400 A | 9/2001 |
| DE | 19709124.5 | 9/1998 |
| DE | 19734055.5 | 2/1999 |
| DE | 19810929.6 | 9/1999 |
| EP | 184914 | 6/1986 |
| EP | 0148145 B1 | 12/1986 |
| EP | 0147379 B1 | 7/1987 |
| EP | 784049 A1 | 7/1997 |
| FR | 2409979 | 6/1979 |
| GB | 947082 | 1/1964 |
| GB | 1198508 A | 7/1970 |
| GB | 2015998 A | 9/1979 |
| JP | 6306020 A | 11/1994 |
| JP | 6306021 A | 11/1994 |
| JP | 7-165682 A | 6/1995 |
| JP | 10-07627 A | 1/1998 |
| JP | 11-228506 A | 8/1999 |
| JP | 2001192701 A | 7/2001 |
| JP | 2001316337 A | 11/2001 |
| JP | 2002249467 A | 9/2002 |
| WO | WO 93/00324 | 1/1993 |
| WO | WO 94/25425 | 11/1994 |
| WO | WO 98/56751 | 12/1998 |
| WO | WO 99/28028 | 6/1999 |
| WO | WO 99/59956 | 11/1999 |
| WO | WO 00/51728 | 9/2000 |
| WO | WO 03/010126 | 2/2003 |

OTHER PUBLICATIONS

Wohl, A., Chemische Berichte 36:4135-4138 (1903).
Fan, "4-Nitrosodiphenylamine," Organic Synthetic Dictionary, Beijing University of Science and Engineering Publication House, (Oct. 2003).
Wei et al., "New Method for Making p-Nitrodiphenylamine," Chemical Report, No. 10 (1996).
Zhu et al., "Study on Hydrogenation of Nitrodyphenylamine in Alkalescence System," Journal of Nanjing University of Technology, vol. 24, No. 6, pp. 48-51 (Nov. 2002).
Stern et al., "Direct Coupling of Aniline and Nitrobenzene: A New Example of Nucleophilic Aromatic Substitution for Hydrogen," J. Am. Chem. Soc. 114:9237-9238 (1992).
Stern et al., "Eliminating Chlorine in the Synthesis of Aromatic Amines: New Routes Which Utilize Nucleophilic Aromatic Substitution for Hydrogen," New J. Chem. 20:259-268 (1996).
Stern, "Chap. 11, Nucleophilic Aromatic Substitution of Hydrogen," ACS Symposium Series 577, Benign by Design (Aug. 1993).
Dickneider, "A Green Chemistry Module," website printout of Nov. 2003, http://academic.scranton.edu/faculty/CANNM1/advancedorganicmodule.htm.
M. Makosza, "Phase transfer catalysis. A general green methodology in organic synthesis," Pure Appl. Chem., vol. 72, No. 7 (2000).
Dai, Tingfeng et al., Fine Petrochemistry, vol. 2 (1998).
Zhang, Zhongmin et al., Jiangxi Chemical Engeering, vol. 2 (1996).

* cited by examiner

1

FALLING FILM EVAPORATOR

CROSS-REFERENCE TO RELATED APPLICATIONS

The present application is a continuation-in-part of U.S. patent application Ser. No. 11/759,901 filed on Jun. 7, 2007, which is a divisional application of U.S. Pat. No. 7,235,694 B2 issued on Jun. 26, 2007, which in turn is a continuation of U.S. Pat. No. 7,084,302 issued on Aug. 1, 2006, which claims priority to CN03148566.9, CN03148195.7, CN03148194.9, CN03148199.X, CN03148565.0, CN03148200.7, CN03148198.1, and CN03148196.5, all filed on Jul. 4, 2003 in China. The contents of all above-mentioned priority applications and patents are incorporated herein by reference in their entirety and for all purposes.

FIELD OF THE INVENTION

The present invention relates to a falling film evaporator for evaporation or concentration of liquid.

BACKGROUND OF THE INVENTION

It has been known to concentrate liquid in evaporators by passing the material to be concentrated or subjected to evaporation through the heating and evaporation tubes while the tubes are heated from the exterior and the material to be evaporated releases steam or vapor which is recovered from the evaporation tubes. However, the evaporators have difficulties in achieving highly effective evaporation. To permit the aqueous liquids to be evaporated to a relatively high final concentration, theses evaporators apply complicated structural designs that allow prolongation of the stay time of the aqueous liquid in the evaporator. However, prolongation of the stay time increases energy consumption and is more likely to cause the decomposition of the thermosensitive material in the aqueous liquid.

In the industrial-scale production, catalysts used in the reactions are expensive, which results in relatively high production cost. To reduce the production cost, the catalysts are often recovered and reused. However, some catalysts are thermosensitive and instable; it becomes very difficult to separate and recover the catalysts without going through complicated operations.

SUMMARY OF THE INVENTION

The present invention provides a falling film evaporator that is useful to concentrate an aqueous liquid. The falling film evaporator of the present invention comprises a shell pass having a top and a bottom, multiple tubes parallel to each other, each having a tube pass with a top and a bottom, a steam inlet on the top of the shell pass, a condensed steam outlet at the bottom of the shell pass, an inlet for the aqueous solution on the top of the tube pass, an outlet for the aqueous solution at the bottom of the tube pass, a distributing assembly below the inlet for the aqueous solution having a plurality of distributing trays arranged vertically from top to bottom in incremental diameters and each having multiple holes, and a plate for collecting the aqueous solution below the distributing assembly and on top of the tube pass. The tubes are straight and installed vertically in the evaporator to avoid deviation of the flow of the liquid from flowing downward vertically in the tubes. The inner wall of the tubes is smooth with little resistance to the flow of the aqueous solution. The top portion of the tubes is protruded above a horizontal plane of the plate.

The falling film evaporator may have an inlet for flow-aiding steam on the top of the shell pass.

The falling film evaporator may be one-stage or multi-stage evaporators. In the multi-stage evaporators, multiple falling film evaporators of the present invention may be connected in series for the operation. The falling film evaporator of the present invention is especially useful for concentrating a liquid mixture that contains thermosensitive materials to be recovered.

The present invention further provides a method for evaporating or concentrating an aqueous liquid that is highly efficient and does not cause the decomposition of the thermosensitive material even at a temperature that is above the temperature of the decomposition for the material. The liquid solution undergoes concentration process within a short period of time with highly efficient operation.

The method for evaporating an aqueous liquid comprises the steps of feeding an aqueous solution through an inlet for the aqueous solution at top of a tube pass of a falling film evaporator, passing the aqueous solution at the top of the tube pass of the falling film evaporator through a distributing assembly that is placed below the top of the tube pass, forming a film of the aqueous solution along the inner wall of the tube pass, flowing the film of the aqueous solution from the top to bottom on the inner wall of the tube pass vertically, accelerating flow rate of the aqueous solution in the tube pass in the same direction, evaporating the aqueous solution while reducing the residence time of the aqueous solution in the tube pass, and obtaining a concentrated aqueous solution through an outlet for the aqueous solution at the bottom of the tube pass of the falling film evaporator.

The method for evaporation of the present invention may further comprise the steps of feeding a steam through a flow-aiding inlet at the top of the tube pass of the falling film evaporator, flowing the steam from the top to the bottom in the tube pass in the same direction as the aqueous solution. The velocity of the aqueous solution is accelerated by the flow-aiding steam. Furthermore, the residence time of the aqueous solution in the tube pass is reduced to about 2 to 60 seconds. The temperature of the aqueous solution in the tube pass is maintained at a range of about 30 to 105° C. The pressure in the falling film evaporator is maintained at a range of about 0.005 to 0.1 MPa (absolute pressure). A flow-aid steam may be fed into the tube pass through multiple flow-aiding inlets at the top of the falling film evaporator. The method may be practiced for multiple times through multiple falling film evaporators connected in series. The aqueous solution may contain thermosensitive materials, such as tetramethyl ammonium hydroxide (TMAH).

Additionally, the present invention provides a method for concentrating an aqueous solution comprising TMAH comprising the steps of feeding an aqueous solution comprising TMAH through an aqueous phase inlet at the top of a tube pass of a falling film evaporator, passing the aqueous solution to the top of the tube pass of the falling film evaporator through a distributing tray that is placed below the top of the tube pass, forming a film of the aqueous solution along the inner wall of the tube pass through the distributing tray, flowing the film of the aqueous solution from the top to the bottom on the inner wall of the tube pass, accelerating flow rate of the aqueous solution in the tube pass in the same direction, evaporating water from the aqueous solution while reducing residence time of the aqueous solution in the tube pass, and obtaining a concentrated aqueous solution through an aqueous phase outlet at the bottom of the tube pass of the falling film evaporator. The residence time the aqueous solution in the tube pass is in a range of 2 to 60 seconds. The temperature of the aqueous solution in the tube pass is maintained at a range of about 30 to 105° C., and the pressure in the falling film evaporator at a range of 0.005 to 0.1 MPa (absolute pressure). A flow-aiding steam may be fed through a flow-aiding inlet at the top of the tube pass of the falling film evaporator and flowing from the top to the bottom in the tube pass in the same direction as the aqueous solution to accelerate.

DETAILED DESCRIPTION OF THE INVENTION

Figure 1:
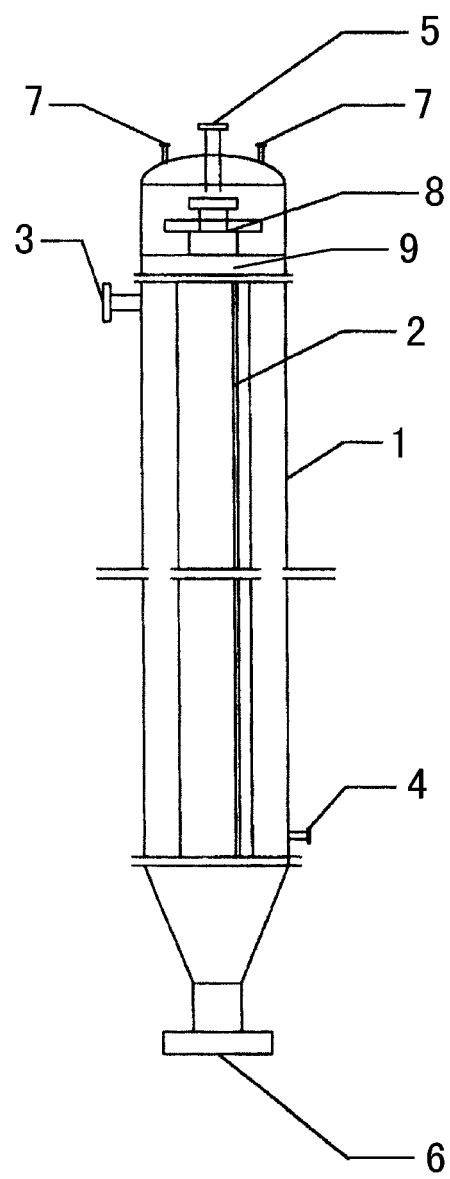
FIG. 1 is a diagram showing a falling film evaporator of the present invention.

As shown in FIG. 1, the falling film evaporator of the present invention has a shell pass 1 and multiple tubes each having a tube pass 2 in the shell pass 1. In the falling film evaporator, the shell pass is heated by steam. An inlet 3 for the steam is located on the top portion of the shell pass 1. An outlet 4 for the condensed steam is located at the lower portion of the shell pass 1. An inlet 5 for the aqueous liquid to be concentrated is at the top of the shell pass 1 and above the tube pass 2; an outlet 6 for the aqueous liquid after being concentrated is located at the bottom of the tube pass 2. The falling film evaporator of the present invention also contains a distributing assembly 8 below the inlet 5, which helps the distribution of the incoming aqueous liquid before entering into the tube pass and facilitates the formation of a thin film along the inner wall of the tube pass. A plate 9 is below the distributing assembly 8 and above the tube pass 2 for collecting the liquid mixture that passes through the distributing assembly.

Optionally, one or more flow-aiding steam inlets 7 may be installed above the tube pass 2. Preferably, 4 to 6 flow-aiding steam inlets 7 are installed on the top. In the falling film evaporator, additional steam enters into the tube pass 2 through the flow-aiding steam inlets 7, while the aqueous solution to be concentrated enters into the tube pass 2 from the inlet 5. The moving direction of the steam in motion is the same as that of the aqueous solution, and the steam is assisting the aqueous solution to flow downwardly and vertically along the inner wall of the tube pass 2. The flow-aiding steam is a driving force that accelerates the velocity of the aqueous solution flowing downwardly and perpendicularly towards the bottom of the tube pass while vapor or steam is evaporated and coming out from the aqueous liquid. Alternatively, no additional steam is used for the flow-aiding purpose, but the aqueous solution is driven downward by the vapor or steam that comes out from the solution itself. As the aqueous liquid flows downward along the inner wall of the tube pass in the form of a thin film, the upper portion of the tube pass has higher pressure than the lower portion. Then, the vapor or steam coming out of the solution will always flow downwardly towards the bottom of the tube pass 2 due to the pressure difference, thus, driving down the aqueous solution to flow even faster.

Figure 2A:
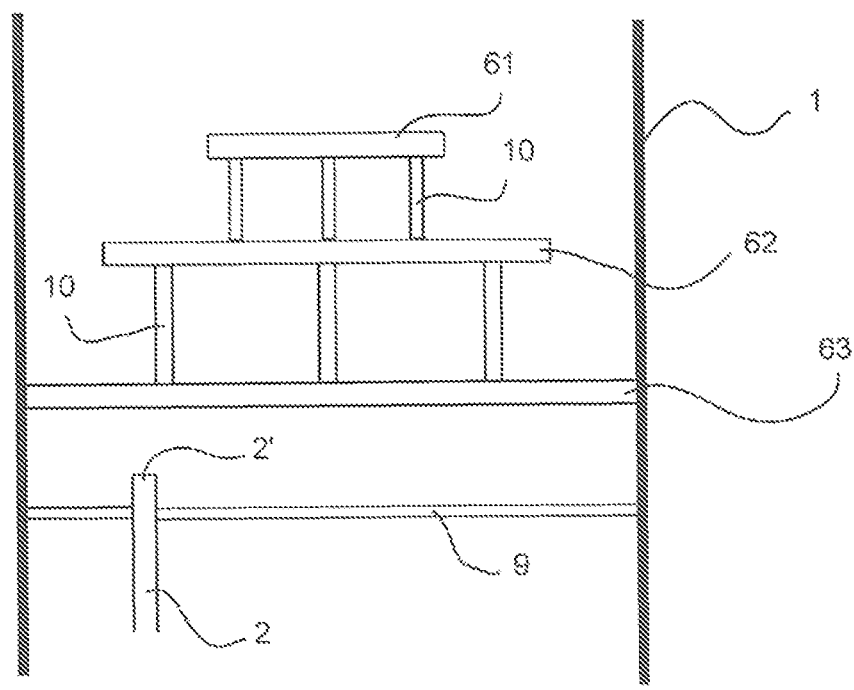
FIG. 2a is a illustration depicting a distributing assembly of the falling film evaporator of the present invention.
Figure 2B:
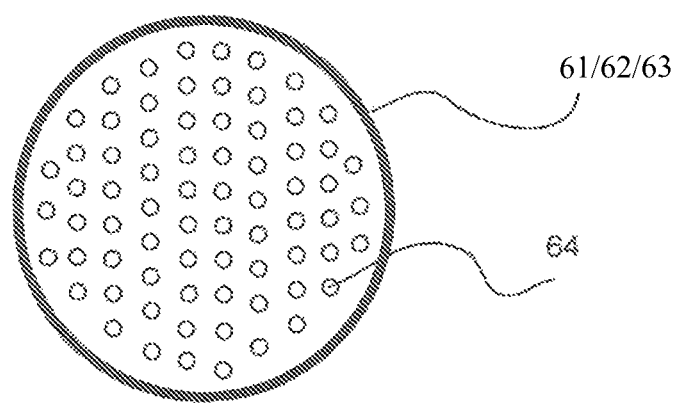
FIG. 2b is a cross sectional view of the distributing tray of the distributing assembly of the falling film evaporator of the present invention.
Figure 3:
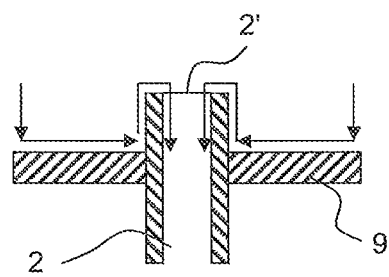
FIG. 3 is a detailed view of the top of the tube and the plate and illustrates the overflow of the aqueous liquid into the tube pass.

Only a single tube is illustrated in the evaporator in FIGS. 1-3. It is understood that in practice, the apparatus has multiplicity of such tubes, each with the same structures as shown in these Figures. The tubes are made of material known to one of ordinary skill in the art. For examples, the tubes are made of stainless steel or carbon steel. The tubes are straight and vertically installed. The tubes are all parallel to each other and are opened ended on both the top and the bottom. The inner wall of the tubes is smooth so that the flow of the aqueous solution in the form of a thin film along the inner wall will not be hindered, decelerated, or met with the resistance due to the inner wall of the tubes. The size of the tubes is between about 5 to 50 mm in diameter, preferably 10 to 40 mm in diameter, more preferably 15 to 35 mm in diameter, and most preferably, 19 to 32 mm in diameter. The number of the tubes inside the shell pass may be in from several hundreds to over one thousand. One of ordinary skill in the art will be able to determine the number and dimension of the tubes based on the desired capacity, conditions, and other parameters of the material and apparatus. The tubes must be installed perpendicularly and as described above so that any helical flow of the aqueous liquid is avoided in the tube pass. The tubes of the falling film evaporator of the present invention must conform to the requirements to ensure that there is no delay of the stay time for the aqueous solution in the tube pass without interrupting that the stay time of the aqueous solution is shortened and the velocity accelerated.

In the distributing assembly of the present invention, one or more distributing trays may be used. The distributing tray(s) are in the form of a round disc and arranged from the top to the bottom and in incremental diameters. Preferably, the diameters are increased about 0.2 to 1.0 time of the preceding tray and more preferably about 0.5 time increase from the preceding tray. The distributing tray may be made of stainless steel or carbon steel. The size of the distributing tray is selected such that the top distributing tray below the inlet for the aqueous solution will be able to have most of the incoming lower concentration aqueous solution flowing therethrough. The bottom distributing tray is of a diameter that is slightly smaller than the diameter of the evaporator where it sits. FIG. 2a illustrates the distributing assembly having 3 distributing trays 61, 62, and 63, arranged from the top to bottom in gradually increased diameters in the shell pass 1 and above the tube pass 2. The distributing trays are supported by columns 10. A plate 9 is installed horizontally below the bottom distributing tray 63. As illustrated in FIG. 2b, each distributing tray 61, 62, and 63 of the distributing assembly 8 has multiple holes 64 through which the aqueous liquid flows through and is distributed. The diameter of the holes 64 on the distributing tray 61, 62, and 63 are in the range of about 1 to 100 mm, preferably 5 to 50 mm, and more preferably, 8 to 25 mm. In one embodiment of the present invention, the distributing assembly has 3 distributing trays, the top and middle trays have holes in the same diameter, and the bottom tray have the holes in a diameter smaller than the upper two trays. The aqueous liquid flows through the trays, is evenly distributed, and then accumulates on the plate. The plate 9 is in a diameter that is equal to or larger than the bottom distributing tray such that all the aqueous solution flowing through the distributing assembly will be collected on the plate 9.

As illustrated in FIG. 3, top 2' of the tube pass 2 is required to be protruded above the horizontal plane of the plate 9. Preferably, the top is about 5 to 35 mm above, more preferably, about 20 to 30 mm above, and most preferably, 25 mm above. The arrows in the solid line show the overflow of the aqueous liquid into the tube pass after being distributed through the distributing assembly and collected on the plate. As the liquid level increases along the outer wall of the tube 2, the liquid gradually reaches the top 2' of the tube pass and overflows into the tube pass while forming a uniform thin film along the inner wall of the tube pass. Initially, the aqueous liquids flows downwardly and perpendicularly along the inner wall of the tube pass in the form of a thin film due to its own gravity. The aqueous liquid is being heated and concentrated as it flows down the inner wall of the tube pass. The aqueous solution is heated both from the steam in the shell pass but also the additional flow-aiding steam in the tube pass. With the driving force of additional flow-aiding gas or the vapor or steam coming out of the aqueous solution, the velocity of the aqueous solution is accelerated and the solution is effectively concentrated within a shortened period of time when it reaches the bottom of the tube pass.

The concentration of the aqueous solution can be conducted using one-stage or multi-stage evaporators connected in series. In the multi-stage concentration, the aqueous solution goes through each falling film evaporator in series and is further concentrated. In general, the heating medium used in the concentration and shell pass may be water, steam, or secondary steam from the preceding stage evaporator.

In the falling film evaporator of the present invention, the aqueous solution, carried by the steam, passes through the distributing assembly and flows in the thin film form from the top to the bottom in the tube pass. The residence time of the aqueous solution is controlled in a range of about 2 to 60 seconds. The temperature of the aqueous solution is at about 30 to 105° C. The pressure of shell pass steam used in the concentration is about 0.005 to 0.1 MPa (absolute pressure).

With the use of the falling film evaporator and utilizing the steam to carry the aqueous solution flowing from the top to the bottom, the liquid flow rate is quickened and the residence time is controlled, at the meantime, the low-boiling point substances in the liquid is largely evaporated at the higher temperature. Thus the decomposition of thermosensitive materials in the liquid can be minimized.

The method for evaporating or concentrating an aqueous liquid that is highly efficient and does not cause the decomposition of the thermosensitive material even at a temperature that is above the temperature of the decomposition for the material. The aqueous solution being concentrated may contain thermosensitive materials, such as tetramethyl ammonium hydroxide.

The method comprises the steps of feeding an aqueous solution through an inlet for the aqueous solution at top of a tube pass of a falling film evaporator, passing the aqueous solution at the top of the tube pass of the falling film evaporator through a distributing assembly that is placed below the top of the tube pass, forming a film of the aqueous solution along inner wall of the tube pass, flowing the film of the aqueous solution from the top to bottom on the inner wall of the tube pass vertically, accelerating flow rate of the aqueous solution in the tube pass in the same direction, evaporating the aqueous solution while reducing residence time of the aqueous solution in the tube pass, and obtaining a concentrated aqueous solution through an outlet for the aqueous solution at the bottom of the tube pass of the falling film evaporator.

The method for evaporation of the present invention may further comprise the steps of feeding a steam through a flow-aiding inlet at the top of the tube pass of the falling film evaporator, flowing the steam from the top to the bottom in the tube pass in the same direction as the aqueous solution. The velocity of the aqueous solution is accelerated by the flow-aiding steam. Furthermore, the residence time of the aqueous solution in the tube pass is reduced to a range of about 2 to 60 seconds. The temperature of the aqueous solution in the tube pass is maintained at a range of about 30 to 105° C. The pressure in the falling film evaporator is maintained at a range of about 0.005 to 0.1 MPa (absolute pressure). A flow-aid steam may be fed into the tube pass through multiple flow-aiding inlets at the top of the falling film evaporator. The method may be practiced for multiple times through multiple falling film evaporators connected in series.

The method of the present invention may be used for concentrating an aqueous solution comprising TMAH. TMAH is a thermosensitive material that will decompose at about 80° C. At the same time, TMAH is an expensive catalyst that need to be reused and recycled. By using the apparatus and method of the present invention, the aqueous solution containing TMAH may be concentrated at a temperature equal to or even higher than the decomposing temperature for TMAH, yet it will not cause TMAH to decompose within the short period of time. Therefore, the present invention is very useful for concentrating and recycling aqueous solution containing thermosensitive materials with high efficiency.

The method has the steps of feeding an aqueous solution comprising tetramethyl ammonium hydroxide through an aqueous phase inlet at top of a tube pass of a falling film evaporator, passing the aqueous solution to the top of the tube pass of the falling film evaporator through a distributing assembly that is placed below the top of the tube pass, forming a film of the aqueous solution along inner wall of the tube pass through the distributing tray, flowing the film of the aqueous solution from the top to bottom on the inner wall of the tube pass, accelerating flow rate of the aqueous solution in the tube pass in the same direction, evaporating water from the aqueous solution while reducing residence time of the aqueous solution in the tube pass, and obtaining a concentrated aqueous solution through an aqueous phase outlet at the bottom of the tube pass of the falling film evaporator. The residence time the aqueous solution in the tube pass is in a range of about 2 to 60 seconds. The temperature of the aqueous solution in the tube pass is maintained at a range of about 30 to 105° C., and the pressure in the falling film evaporator at a range of about 0.005 to 0.1 MPa (absolute pressure). A flow-aiding steam may be fed through a flow-aiding inlet at the top of the tube pass of the falling film evaporator and flowing from the top to the bottom in the tube pass in the same direction as the aqueous solution to accelerate.

The following examples further describe the present invention, but do not limit the scope of the present invention. One of ordinary skill in the art would understand that minor modifications and variations may be made on the description and examples of the present invention without departing from the scope of the present invention.

EXAMPLE 1

An aqueous phase from extraction of a reaction mixture containing methanol and catalyst comprising TMAH were preheated to 80° C. and fed at a flow rate of 540 liter/hour via a metering pump to the top of a falling film evaporator of the present invention. The shell pass of the evaporator was heated with 120° C. steam. The residence time of the mixture in the evaporator was 10 seconds. The primary concentrated liquid was conveyed to a second-stage falling film evaporator under 0.1 MPa (absolute pressure), and the residence time of the aqueous solution in the subsequent evaporator was 10 seconds. The temperature of the gas-liquid mixture discharged from the second-stage falling film evaporator was 80-95° C. After separating via secondary gas-liquid separator, the recovery ratio of the catalyst in the whole concentrating process was as high as 99.7%. The concentrated catalyst was recycled and reused. Methanol and water were obtained from the gas phase.

EXAMPLE 2

An aqueous solution was preheated to 80° C. and fed at a flow rate of 767 liter/hour to the top of a falling film evaporator of the present invention. The shell pass of the evaporator was heated with 120° C. steam. The residence time of the mixture in the evaporator was 10 seconds and the temperature of the material coming out at the bottom of the evaporator was 100-105° C. Then, the primary concentrated liquid was conveyed to a second-stage falling film evaporator at 300 liter/hour under 0.03 MPa (absolute pressure) in the evaporator, and the residence time of the aqueous solution in the subsequent evaporator was 10 seconds. The temperature of the gas-liquid mixture discharged from the second-stage falling film evaporator was 80-95° C. After separating via secondary gas-liquid separator, the recovery ratio of the catalyst in the whole concentrating process was 99.7%. The concentrated catalyst was recycled and reused. Methanol and water were obtained from the gas phase.

We claim:

1. A falling film evaporator comprising
a shell having a top and a bottom,
multiple tubes parallel to each other installed vertically inside the shell, each tube having a top, a bottom, smooth surface on its inner wall, and a protrusion above a horizontal surface on the top of the multiple tubes,
a steam inlet on the top of the shell,
a condensed steam outlet at the bottom of the shell,
an inlet for an aqueous solution on the top of the tube,
an outlet for the aqueous solution at the bottom of the tube,
a distributing assembly below the inlet for the aqueous solution having two or more distributing trays that are installed horizontally and arranged vertically from top to bottom, each tray being in a form of a disc that increases in diameter from the top to the bottom, and each disc having multiple holes that are substantially uniformly distributed thereon, and
a plate that forms the horizontal surface on the top of the multiple tubes and below the distributing assembly for collecting the aqueous solution,
wherein
the protrusion on the top portion of the tube above the horizontal surface of the plate causes an overflow of the aqueous solution into the tube to form a film along the inner wall of the tube.

2. The falling film evaporator according to claim 1, wherein the evaporator is a one-stage or multi-stage falling film evaporators having each stage of the falling film evaporators connected in series.

3. The falling film evaporator according to claim 2, wherein heat medium in the evaporator is water, steam, or secondary steam from previous stage evaporator.

4. The falling film evaporator according to claim 1, further comprising
an inlet for flow-aiding steam on the top of the shell.

5. The falling film evaporator according to claim 1, wherein each disc in the distributing assembly increases in diameter by about 0.5 times from the top to the bottom.

6. The falling film evaporator according to claim 1, wherein the aqueous solution flows through and is distributed through the multiple holes on each disc of the distributing assembly.

7. The falling film evaporator according to claim 6, wherein diameters of the holes on the distributing tray are in the range of about 1 to 100 mm.

8. The falling film evaporator according to claim 7, wherein the bottom distributing tray has multiple holes in a diameter smaller than that of the upper distributing tray.

9. The falling film evaporator according to claim 1, wherein the protrusion at the top of the tube is protruded about 5 to 35 mm above the horizontal surface of the plate.

10. A method for evaporating an aqueous solution by the falling film evaporator of claim 1, comprising
feeding an aqueous solution through the inlet for the aqueous solution at the top of the tube,
passing the aqueous solution at the top of the tube through the distributing assembly,
forming a film of the aqueous solution along the inner wall of the tube,
flowing the film of the aqueous solution from the top to the bottom on the inner wall of the tube vertically,
accelerating flow rate of the aqueous solution in the tube in the same direction as the flow of the aqueous solution,
evaporating the aqueous solution while reducing residence time of the aqueous solution in the tube, and
obtaining a concentrated aqueous solution through the outlet for the aqueous solution at the bottom of the tube.

11. The method for evaporating the aqueous solution by using the falling film evaporator of claim 4, comprising
feeding an aqueous solution through the inlet for the aqueous solution at the top of the tube,
passing the aqueous solution at the top of the tube through the distributing assembly below the top of the tube,
forming a film of the aqueous solution along the inner wall of the tube,
flowing the film of the aqueous solution from the top to the bottom on the inner wall of the tube vertically,
feeding steam through the flow-aiding inlet at the top of the tube,
flowing the steam from the top to the bottom in the tube in the same direction as the aqueous solution and accelerating flow rate of the aqueous solution in the tube in the same direction as the flow of the aqueous solution by the steam,
evaporating the aqueous solution while reducing residence time of the aqueous solution in the tube, and
obtaining a concentrated aqueous solution through the outlet for the aqueous solution at the bottom of the tube.

12. The method for evaporating an aqueous solution according to claim 10, further comprising
reducing residence time of the aqueous solution in the tube to a range of about 2 to 60 seconds.

13. The method for evaporating an aqueous solution according to claim 10, further comprising
maintaining temperature of the aqueous solution in the tube at a range of about 30 to 105° C.

14. The method for evaporating an aqueous solution according to claim 10, further comprising
maintaining pressure in the falling film evaporator at a range of about 0.005 to 0.1 MPa (absolute pressure).

15. The method for evaporating an aqueous solution according to claim 11, further comprising
feeding the steam through multiple flow-aiding inlets at the top of the falling film evaporator.

16. The method for evaporating an aqueous solution according to claim 10, further comprising
practicing the method multiple times through multiple falling film evaporators connected in series.

17. The method for evaporating an aqueous solution according to claim 10, wherein the aqueous solution contains thermosensitive material.

18. The method for evaporating an aqueous solution according to claim 17, wherein the thermosensitive material is tetramethyl ammonium hydroxide.

19. A method for concentrating an aqueous solution comprising tetramethyl ammonium hydroxide by the falling film evaporator of claim 1, comprising
- feeding an aqueous solution comprising tetramethyl ammonium hydroxide through the aqueous phase inlet at the top of the tube,
- passing the aqueous solution to the top of the tube through the distributing assembly below the top of the tube,
- forming a film of the aqueous solution along the inner wall of the tube through the distributing assembly,
- flowing the film of the aqueous solution from the top to the bottom on the inner wall of the tube,
- accelerating flow rate of the aqueous solution in the tube in the same direction as the flow of the aqueous solution,
- evaporating water from the aqueous solution while reducing residence time of the aqueous solution in the tube, and
- obtaining a concentrated aqueous solution through the aqueous phase outlet at the bottom of the tube,
- wherein the residence time the aqueous solution in the tube is in a range of about 2 to 60 seconds.

20. The method for evaporating an aqueous solution according to claim 19, further comprising
- maintaining temperature of the aqueous solution in the tube at a range of about 30 to 105° C.

21. The method for evaporating an aqueous solution according to claim 19, further comprising
- maintaining pressure in the falling film evaporator at a range of about 0.005 to 0.1 MPa (absolute pressure).

22. The method for evaporating an aqueous solution comprising tetramethyl ammonium hydroxide by using the falling film evaporator of claim 4, comprising
- feeding an aqueous solution through the inlet for the aqueous solution at the top of the tube,
- passing the aqueous solution at the top of the tube through the distributing assembly below the top of the tube,
- forming a film of the aqueous solution along the inner wall of the tube,
- flowing the film of the aqueous solution from the top to the bottom on the inner wall of the tube vertically,
- feeding steam through the flow-aiding inlet at the top of the tube,
- flowing the steam from the top to the bottom in the tube in the same direction as the aqueous solution and accelerating flow rate of the aqueous solution in the tube in the same direction as the flow of the aqueous solution,
- evaporating the aqueous solution while reducing residence time of the aqueous solution in the tube,
- obtaining a concentrated aqueous solution through the outlet for the aqueous solution at the bottom of the tube.

* * * * *